US012715074B2

(12) United States Patent
Campagnoli et al.

(10) Patent No.: US 12,715,074 B2
(45) Date of Patent: Aug. 25, 2026

(54) APPARATUS AND METHOD FOR NON-CONTACT PROCESSING A RIBBON-LIKE ARTICLE, PREFERABLY FOR PRODUCING ELECTROCHEMICAL CELLS

(71) Applicant: G.D S.P.A., Bologna (IT)

(72) Inventors: Enrico Campagnoli, Bologna (IT); Andrea Biondi, Bologna (IT)

(73) Assignee: G.D S.P.A., Bologna (IT)

(*) Notice: Subject to any disclaimer, the term of this patent is extended or adjusted under 35 U.S.C. 154(b) by 144 days.

(21) Appl. No.: 18/722,409

(22) PCT Filed: Dec. 22, 2022

(86) PCT No.: PCT/IB2022/062685
§ 371 (c)(1),
(2) Date: Jun. 20, 2024

(87) PCT Pub. No.: WO2023/119225
PCT Pub. Date: Jun. 29, 2023

(65) Prior Publication Data
US 2025/0128356 A1 Apr. 24, 2025

(30) Foreign Application Priority Data
Dec. 22, 2021 (IT) ........................ 102021000032321

(51) Int. Cl.
*B23K 26/362* (2014.01)
*B23K 26/08* (2014.01)
(Continued)

(52) U.S. Cl.
CPC .......... *B23K 26/362* (2013.01); *B23K 26/083* (2013.01); *H01M 4/04* (2013.01); *B23K 2101/16* (2018.08); *B23K 2101/36* (2018.08)

(58) Field of Classification Search
CPC ................ B23K 26/362; B23K 26/083; B23K 2101/16; B23K 2101/36; B23K 26/082;
(Continued)

(56) References Cited

U.S. PATENT DOCUMENTS 4,767,909 A 8/1988 Okumoto
5,318,600 A * 6/1994 Schlaikjer ............... H01M 4/04 29/623.5
2023/0405706 A1* 12/2023 Cyphert ............... B23K 20/233

FOREIGN PATENT DOCUMENTS

DE 4301575 A1 7/1993
JP H11254176 A 9/1999
WO 2015064418 A1 5/2015

OTHER PUBLICATIONS

International Search Report and Written Opinion for International Patent Application No. PCT/IB2022/062685, mailed May 9, 2023.

* cited by examiner

*Primary Examiner* — Nahida Sultana
(74) *Attorney, Agent, or Firm* — Andrus Intellectual Property Law, LLP

(57) ABSTRACT

An apparatus for non-contact processing a ribbon-like article includes a conveying device of the ribbon-like article including an inlet section, an outlet section and a connecting part, and at least two operating units configured to perform non-contact processing on the ribbon-like article, the operating units being movable along a loop path. The apparatus also includes a device for varying the speed of movement of said operating units configured in such a way as to vary the speed of each of the operating units, individually, depending on a position thereof along the loop path.

24 Claims, 5 Drawing Sheets

(51) Int. Cl.
*B23K 101/16* (2006.01)
*B23K 101/36* (2006.01)
*H01M 4/04* (2006.01)

(58) Field of Classification Search
CPC .. B23K 26/0846; B23K 26/103; B23K 26/16; B23K 26/0676; B23K 26/359; H01M 4/04
See application file for complete search history.

APPARATUS AND METHOD FOR NON-CONTACT PROCESSING A RIBBON-LIKE ARTICLE, PREFERABLY FOR PRODUCING ELECTROCHEMICAL CELLS

CROSS-REFERENCE TO RELATED APPLICATIONS

This is a national stage application filed under 37 U.S.C. 371 based on International Patent Application No. PCT/IB2022/062685, filed on Dec. 22, 2022, which claims priority to Italian Patent Application No. 102021000032321, filed on Dec. 22, 2021, the disclosures of which are incorporated herein by reference in their entireties.

The present invention relates to an apparatus for non-contact processing a ribbon-like article, preferably for producing electrochemical cells.

It also relates to a method for non-contact processing a ribbon-like article.

The present invention is preferably, though not exclusively, applied to the field of electrochemical cell production and, more generally, to the technical field of manufacturing products formed from a ribbon-like article.

In particular, in the relevant technical field, it is known to use ribbons made of conductive material which are wound to create the anode and/or cathode of electrochemical cells.

In known manufacturing processes, such ribbons are submitted to a patterning processing at one edge thereof, before being cut and wound to form a sandwich structure consisting of a pair of conductive materials separated by an insulating layer in order to form the anode and cathode of the electrochemical cell.

Such processing can be done by means of laser heads which operate on the concerned portion of the ribbon so as to create the desired pattern.

In a known embodiment, the ribbon is slid relative to a stationary laser head that directs a light beam onto the moving ribbon so as to obtain the required processing.

In the present disclosure as well as in the accompanying claims, certain terms and expressions are deemed to have the meaning expressed in the following definitions, unless expressly stated otherwise.

The term "ribbon-like article" refers to any solid product which, within an industrial production line, is in the form of an elongated strip, i.e. an element wherein the longitudinal extension is significantly greater than its transverse extension.

The ribbon-like article also has such characteristics as to allow for some flection as it is fed along a relative production line.

The ribbon-like article can, for example, be made of a conductive material and be used, possibly once cut, to form a sandwich structure for creating electrochemical cells, together with other layers. The term "loop path" refers to a path that the ribbon-like article or other element performs between a starting point and an end point. The loop path can be "closed", in case the starting point and the end point coincide, or "open", in case the starting point and the end point are close to each other but not coincident.

The term "non-contact processing" refers to any type of processing that can take place without any contact between the ribbon-like article and the operating unit performing the processing. Such processing can be carried out by supplying energy to the ribbon-like article, for example by means of a light beam or by ultrasound. Possible non-contact processing include patterning, etching, and so on.

The term "continuous" related to an expression of motion refers to an operation that occurs uninterruptedly, without there being a stop or interruption in the operation concerned. In particular, referring to a processing on a ribbon-like article, the term "continuous" indicates that processing takes place continuously on the ribbon-like article, with no interruptions in the processing carried so out.

It should also be noted that the expression "moving an object between a first position and a second position" refers both to the movement from the first position to the second position as well as to the movement from the second position to the first position.

Such definition applies in much the same way to similar expressions of motion, such as transferring or moving a generic object between two positions or between two areas or even between two different operating configurations.

The Applicant, in the context of the constant need to increase the performance and efficiency of manufacturing processes, has preliminarily observed how, in a line for non-contact processing a ribbon-like article, the feed rate of the ribbon-like article relative to the operating unit performing the processing can be an important element limiting the production capacity of the line itself.

Such a limitation, furthermore, is even more critical in case the processing requires to create, on the narrow-like article to be processed, relatively small details such as in the case of pattern making. In particular, the Applicant observed that the ribbon-like article must be fed in relation to the operating unit at a sufficiently low speed in order to guarantee the correct execution of the required processing.

Such a requirement involves an overall slowdown in the production line, unless it is provided to slow down the ribbon-like article at the operating units.

The Applicant noted, however, that such a solution involves the formation of tension states on the ribbon-like article, which can compromise the manufacturing quality of the final product obtained by means of the ribbon-like article once processed.

In order to increase the speed of execution of non-contact processing on a ribbon-like article, the Applicant therefore realised that this can be achieved by setting in motion, in addition to the ribbon-like article, also the operating unit.

The Applicant also noted that, using more than one operating unit, it is possible to have one of the operating units perform reset actions, while the other one performs the processing.

The Applicant therefore further realised that it is possible to increase the feed rate of the ribbon-like article compared to known solutions if the speed, at which the operating units move, does not remain constant along the loop path on which they pass in order to perform the non-contact processing on the article.

The Applicant finally found that by providing the possibility of varying the speed of movement of each of the operating units performing non-contact processing, depending on their position along the loop path, it is possible to select, where necessary, the most appropriate speed for the operating units so that they can also carry out processing operations that require high precision.

Thanks to these features, the ribbon-like article can be fed relative to the operating units, when these are in specific positions along their path, at a relative speed that is low enough to allow the required processing to be carried out, without the need to stop or slow down the ribbon-like article.

Therefore, the present invention, in a first aspect thereof, relates to an apparatus for non-contact processing a ribbon-like article, preferably for producing electrochemical cells.

Preferably the apparatus comprises a device for conveying the ribbon-like article which comprises an inlet section, an outlet section and a connecting part extending between said inlet section and said outlet section.

Preferably, the apparatus comprises at least two operating units configured to perform non-contact processing on the ribbon-like article, said operating units being preferably movable along a loop path. Preferably, such a loop path comprises a processing portion facing said connecting part along which the operating units can perform non-contact processing on the ribbon-like article.

Preferably the apparatus comprises a variation device for varying the speed of movement of said operating units.

Preferably said variation device is configured to vary the speed of each of said operating units, individually, depending on their position along said loop path.

Thanks to these characteristics, the apparatus for non-contact processing a ribbon-like article can change the speed of each of the operating units to make it move at a different speed in the loop path along which it moves.

It is thereby possible to suitably adjust the speed of the operating unit such as to provide for the correct relative speed between the ribbon-like article and the operating unit itself when non-contact processing is performed whereas this speed is varied when there is no need to control the speed. Thanks to these characteristics it is possible to feed the ribbon-like article continuously and/or at a higher speed than the known solutions in such a way as to increase the productivity of the production line on which the apparatus made according to the aforementioned aspect of the present invention is applied.

The present invention, in a second aspect thereof, relates to a method for non-contact processing a ribbon-like article, preferably for producing electrochemical cells.

Preferably, the method comprises arranging at least two operating units configured to perform non-contact processing on the ribbon-like article, said operating units being movable preferably along a loop path comprising a processing portion along which said operating units are facing the ribbon-like article.

Preferably, the method comprises feeding the ribbon-like article at a feed rate on a conveying so device.

Preferably the method comprises performing, by means of at least one of said operating units a predetermined non-contact processing on the ribbon-like article while said ribbon-like article moves at said feed rate and said at least one operating unit moves along said processing portion at a first speed.

Preferably the method comprises increasing the speed of said at least one operating unit to a second speed, which is higher than said first speed when it has finished non-contact processing on the ribbon-like article, at a reset portion of said loop path.

The method according to this aspect of the invention makes it possible to provide two distinct speeds for the operating unit, a first one to carry out the non-contact processing on the ribbon-like article and a second one that can be used when the operating unit is not performing the processing. It is thereby possible to have the operating unit adopt the most appropriate speed during the processing, without affecting the productivity of the apparatus.

The present invention, in a third aspect thereof, relates to an apparatus for non-contact processing a ribbon-like article, preferably for producing electrochemical cells.

Preferably, the apparatus comprises a device for conveying the ribbon-like article comprising an inlet section, an outlet section and a connecting part extending between said inlet section and said outlet section.

Preferably the apparatus comprises at least two operating units configured to perform non-contact processing on the ribbon-like article, these operating units being preferably movable along a loop path. Preferably, such a loop path comprises a processing portion facing said connecting part along which the operating units can perform non-contact processing on the ribbon-like article.

Preferably, said conveying device is configured in such a way that the ribbon-like article is fed at a feed rate along said connecting part, and said operating units are configured in such a way as to move at a first speed along said processing portion.

Preferably the speed difference between said first speed and said feed rate is lower than a predetermined value.

Thanks to these characteristics, the apparatus for non-contact processing a ribbon-like article can operate by maintaining a speed difference between the ribbon-like article and the operating units lower than a certain value so that the operating unit can perform the intended non-contact processing.

The ribbon-like article can thereby be fed continuously and/or at a higher speed than known solutions in such a way as to increase the productivity of the production line on which the apparatus made according to the aforesaid aspect of the present invention is applied.

The present invention, in a fourth aspect thereof, relates to a method for non-contact processing a ribbon-like article, preferably for producing electrochemical cells.

Preferably the method comprises arranging at least two operating units configured to perform non-contact processing on the ribbon-like article, said operating units being preferably movable along a loop path. Preferably the loop path comprises a processing portion along which said operating units are facing the ribbon-like article and a reset portion.

Preferably, the method comprises feeding the ribbon-like article on a conveying device at a feed rate.

Preferably the method comprises performing, by means of at least one of said operating units a predetermined non-contact processing on the ribbon-like article while said ribbon-like article moves at said feed rate and said at least one operating unit moves along said processing portion at a first speed.

Preferably the speed difference between said first speed and said feed rate is lower than a predetermined value.

The method according to this aspect allows to carry out non-contact processing on the ribbon-like article while the operating unit performing the processing is moved, controlling at the same time the speed difference between it and the ribbon-like article itself, still to the benefit of the productivity of the apparatus and the production line to which it can be applied.

The present invention, in a fifth aspect thereof, relates to a method for non-contact processing a ribbon-like article, preferably for producing electrochemical cells.

Preferably, the method comprises arranging at least two operating units configured to perform non-contact processing on the ribbon-like article, these operating units being movable preferably along a loop path. The loop path preferably comprises a processing portion along which said operating units are facing the narrow-like article and a reset portion following said processing portion along said loop path. Preferably, said operating units move by being placed in a different position to each other in the said loop path.

Preferably, the method comprises providing said operating units with a set of processing instructions based on which a predetermined non-contact processing on the ribbon-like article is carried out.

Preferably, the method comprises feeding the ribbon-like article on a conveying device.

Preferably the method comprises performing, by means of at least one of said operating units, the predetermined non-contact processing, provided to said operating units, on the ribbon-like article while said ribbon-like article moves on said conveying device and at least one of said operating units moves along said processing portion.

Preferably the method comprises providing one of said operating units with a further set of processing instructions based on which a further predetermined non-contact processing on the ribbon-like article is carried out when said operating unit passes along the reset portion.

Preferably the method comprises performing, by means of said operating unit, the further predetermined non-contact processing provided to said operating unit on the ribbon-like article while said ribbon-like article moves at said feed rate and as said operating unit moves along said processing portion.

Due to these characteristics, the method for non-contact processing a ribbon-like article can carry out cyclic processing on the ribbon-like article even if the processing pace neither corresponds to the time required by the operating unit to run along the entire loop path nor is a multiple or sub-multiple thereof. In fact, while passing through the reset portion, the operating unit can be reprogrammed, through the provision of appropriate processing instructions, thus obviating any lack of synchronisation between the processing pace and the motion of the unit.

It is thereby possible to use a same apparatus to process different formats, as there is no need to provide specific geometric ratios between the components that determine the movement of the operating unit and the ribbon-like article respectively in the apparatus. In other words, thanks to the aforesaid aspect, it is possible to simplify the so-called format changeover operations.

The present invention, in at least one of the aforesaid aspects, can have at least one of the further preferred characteristics listed hereinafter.

In preferred embodiments, such operating units are configured in such a way as to move at a second speed, higher than said first speed, along a reset portion of said loop path. Preferably, said variation device is configured in such a way as to vary the speed of the operating unit from said first speed to said second speed and vice versa.

Thanks to this characteristic, it is possible to adopt a higher speed for the operating units when they are not performing a processing on the ribbon-like article. In this way, a reduction in the speed of the operating units as they perform the processing on the ribbon-like article can be compensated for by the increase in speed in the reset portion.

Preferably said first speed is lower and concordant in direction to a feed rate of the ribbon-like article in said processing portion. It is thereby possible to obtain a configuration such that the operating units follow the ribbon-like article, a configuration that allows to obtain the maximum feed rate of the ribbon-like article compatible with the processing capacity of the operating units. In some embodiments, said connecting part extends along an arc of a circle and defines a centre of curvature, said operating units being rotatable around an axis of rotation passing through said centre of curvature.

Thanks to the above-mentioned characteristic, it is possible to obtain a compact solution for manufacturing the apparatus, using a wheel for moving the ribbon-like article in the area where the processing takes place and adopting rotating operating units, with the axis of rotation concentric to the arc of a circle defined by the ribbon-like article during its movement.

Preferably said loop path is closed. In some embodiments, said loop path is formed by a circumference. The aforesaid characteristics all contribute to provide that the operating units move continuously, making a complete revolution, possibly a complete rotation, during the operation of the apparatus.

Preferably said processing portion and said reset portion are sectors of said circumference.

It is thereby possible to easily and clearly divide the steps in which the operating units perform the processing and in which they move at a certain speed, from those in which they do not perform the processing and a different speed can be provided for them.

Preferably said operating units are supported on respective arms extending radially from a rotating body.

It is thereby possible to simply support the operating units, placing them in the appropriate position for the required processing, limiting the inertial masses in the apparatus.

In some embodiments, said arms are supported on respective ring-shaped bodies that extend perimetrically to said rotating body and are rotationally constrained thereto.

This characteristic allows the arms to be precisely supported on the rotating body, while at the same time allowing to increase/reduce the rotation speed of one of the rotating bodies by the relative movement between the ring-shaped body and the rotating body.

Preferably the rotating body is hollow and is configured in such a way as to allow the passage of a light beam, said light beam being transmitted through respective slots formed in said rotating body to each of said arms.

Thanks to this characteristic, the processing can be carried out by laser and the corresponding light beam can easily be brought to the processing area defined by the operating unit.

Preferably, said rotating body comprises a further slot, arranged radially opposite to said slot and through which a support protrudes towards the inside of said rotating body, the support being connected to a respective ring-shaped body and supporting a reflecting element placed in such a way as to intercept said light beam at the axis of rotation and configured in such a way as to divert said light beam towards a respective arm.

A single light beam can thereby be sent to each of the operating units, simplifying the manufacturing of the apparatus.

Preferably, the operating units are configured in such a way that they are located in separate positions along said loop path, so that at least one of said operating units is placed in said processing portion of the loop path in such a way as to perform non-contact processing on the ribbon-like article. Preferably, the apparatus comprises at least three operating units, wherein at least two of said operating units are placed in said processing portion of the loop path in such a way as to perform non-contact processing on the ribbon-like article. Preferably the apparatus comprises at least six operating units, wherein at least five of said operating units are placed in said processing portion of the loop path in such a way as to perform non-contact processing on the ribbon-like article.

Thanks to these characteristics, a continuous processing of the ribbon-like article can be guaranteed, since an operating unit is always present in a position suitable to perform the requested processing, while nevertheless providing that the speed control provided for by the aforementioned aspects of the present invention takes place.

Preferably said operating units are movable along said loop path independently of each other. It is thereby possible to control the speed of each of the operating units independently of the others, depending on the specific operating needs.

Preferably such a variation device is configured in such a way as to move each of said arms, individually, along a perimeter direction of said rotating body.

It is thereby possible to make a speed variation by operating through mechanical kinematic mechanism, reducing the need for electronic components and position sensors.

Preferably said variation device comprises a first rod rotatably connected to said rotating body and a second rod rotatably connected at a first end thereof to said arm and at a second end thereof to said first rod, in such a way that a rotation of said first rod results in the movement of the relative arm. Preferably said variation device is configured in such a way as to move a respective arm in relation to said rotating body when said arm is in said reset portion. Preferably, said operating units are configured in such a way as to carry out non-contact processing on the ribbon-like article as the ribbon-like article is fed along said connecting part.

These characteristics make it possible to adjust the speed by the rotation of rods, with a solution that is particularly simple and effective from the constructive point of view and generally reliable. In addition, the variation can take place at the reset area, once processing is finished.

In some embodiments, said conveying device comprises a main wheel along which said connecting part is defined. Preferably said main wheel comprises a perimeter wall configured in such a way that the ribbon-like article is supported on said perimeter wall externally to said main wheel and being further configured in such a way that an edge of the ribbon-like article protrudes in an axial so direction from said perimeter wall.

It is thereby possible to arrange the ribbon-like article in an appropriate way in order to make specific processing at an edge thereof, thus making the apparatus particularly suitable for the production of electrochemical cells.

Preferably, said operating units are positioned inside said perimeter wall in such a way that they face the ribbon-like article.

Preferably the apparatus comprises a suction device positioned outside said main wheel along at least a portion of its perimeter.

It is thereby possible to adopt a particularly compact solution for the operating units, while also leaving an area available for a suction device which can be used to remove any processing residues.

In some embodiments, said operating units are positioned internally and externally to said perimeter wall in such a way as to carry out operations on opposite faces of the ribbon-like article.

Two different operations can thereby be carried out simultaneously on the opposite sides of the ribbon-like article with a significant increase in productivity.

Preferably said main wheel is rotatable around said axis of rotation with a constant rotation speed. Thereby, it can be ensured that the feed rate of the ribbon-like article is constant.

In some embodiments, said inlet section comprises a first wheel and said outlet section comprises a second wheel.

Such characteristic makes it possible to create a compact structure capable of guaranteeing high productivity.

Preferably, the apparatus comprises a protection element arranged along said loop path at said reset portion configured in such a way as to prevent the operating units from performing processing on the ribbon-like article along said reset portion.

Thanks to this characteristic, operating units, capable of performing non-contact processing, are prevented from accidentally performing processing on the ribbon-like article outside the operating portion.

Preferably the operating units comprise galvanometers. Preferably, said operating units comprise movable processing elements configured to perform non-contact processing on the ribbon-like article, said movable processing elements being preferably configured to have a response time of the order of a millisecond. In some embodiments, said movable processing elements comprise movable mirrors.

These characteristics each contribute to making the apparatus particularly suitable for laser processing intended for creating patterns on the ribbon-like article. In fact, the accuracy of the processing achieved by the movable elements is not affected by the absolute speed of the ribbon-so like article thanks to the fact that the relative speed of the latter relative to the operating units can be significantly reduced.

Preferably, said operating units are configured in such a way as to move at a second speed, higher than said first speed, along said reset portion of said loop path.

Thanks to this characteristic, it is possible to adopt a higher speed for the operating units when they are not performing a processing on the ribbon-like article. In this way, a reduction in the speed of the operating units as they perform the processing on the ribbon-like article can be compensated for by the increase in speed in the reset portion.

Preferably said first speed is lower and concordant in direction to a linear feed rate of the ribbon-like article.

It is thereby possible to obtain a configuration such that the operating units follow the ribbon-like article, a configuration that allows to obtain the maximum feed rate of the ribbon-like article compatible with the processing capacity of the operating units.

In some embodiments, these operating units rotate around an axis of rotation. It is thereby possible to carry out the movement of the operating units in a simple and easily controllable manner.

Preferably said operating units move in separate positions along said loop path, at least one of said operating units is placed in the processing portion and performs non-contact processing on the ribbon-like article when the other one of said operating units is placed in the reset portion. Preferably it is envisaged to provide at least three operating units, wherein at least two of said operating units are located in said processing portion and simultaneously perform non-contact processing on the ribbon-like article when the other of said operating units is located in the reset portion. Preferably it is envisaged to provide at least six operating units, wherein at least five of said operating units are located in said processing portion and simultaneously perform non-contact processing on the ribbon-like article when the other of said operating units is located in the reset portion.

Thanks to this characteristic, a continuous processing of the ribbon-like article can be guaranteed, since an operating unit is always present in a position suitable to perform the requested processing, while nevertheless providing that the speed control, provided for by the aforementioned aspects of the present invention, takes place.

Preferably, the speed of said operating units is varied, individually, depending on their position along said loop path. Thanks to this characteristic, it is possible to change the speed of the operating units according to their position within the loop path, adapting it to the specific operating needs associated with each portion of the path.

In some embodiments said operating units are supported on arms constrained to a rotating body, so the speed of each of said operating units being varied by moving a respective arm with respect to said rotating body while said rotating body rotates, said arms being movable independently of each other. Preferably the speed of each of said operating units is increased by moving the respective arm in a direction with respect to said rotating body and is decreased by moving the respective arm in the opposite direction.

Such characteristics each allow to make a speed variation by operating through mechanical kinematic mechanisms, reducing the need for electronic components and position sensors.

Preferably, said ribbon-like article is wound on a main wheel of the conveying device. Preferably, said ribbon-like article is fed on said conveying device with a constant speed and tension.

Thanks to these characteristics, it is possible to move the ribbon-like article in a constant manner, while ensuring a constant tension during the movement thereof.

In some embodiments, said ribbon-like article protrudes axially with respect to a perimeter wall of the main wheel. It is thereby possible to suitably arrange the ribbon-like article in order to make specific processing at one edge thereof, facilitating the processing of ribbon-like articles for making electrochemical cells.

In some embodiments, performing said non-contact processing comprises moving movable processing elements of said operating units at a speed higher than the feed rate of the ribbon-like article, preferably with a response time of the movable processing elements of the order of a millisecond. Also these characteristics each contribute to making the apparatus highly suitable for laser processing intended to create patterns on the ribbon-like article.

Preferably, said reset portion is subsequent to said processing portion along said loop path. The speed of the operating unit can thereby be varied within the reset portion of the loop path once processing has been performed on the ribbon-like article.

It is preferably envisaged to provide said operating units with a set of processing instructions based on which said predetermined non-contact processing on the ribbon-like article is carried out prior to performing the predetermined non-contact processing on the ribbon-like article.

Preferably, once the at least one of said operating units has performed said predetermined non-contact processing on the ribbon-like article, it is envisaged to provide a second set of processing instructions, based on which a further predetermined non-contact processing on the ribbon-like article is to be carried out, to said at least one operating unit when said at least one operating unit passes along said reset portion.

Preferably, it is envisaged to perform by means of the at least one operating unit the further predetermined non-contact processing provided to said operating unit on the ribbon-like article while said ribbon-like article moves at said feed rate and while said operating unit is moves along so said processing portion.

Also thanks to these characteristics, it is possible to use the same apparatus for processing different formats, as it is not necessary to provide specific geometric ratios between the components that determine the movement of the operating unit and the ribbon-like article in the apparatus respectively.

Preferably said non-contact processing is carried out by supplying energy to the ribbon-like article.

Preferably, said energy is supplied to the ribbon-like article by means of a light beam or by ultrasound.

Preferably said non-contact processing is a non-contact laser processing, therefore performed by laser.

Preferably said operating units are laser heads.

Preferably said non-contact processing includes patterning or etching processing.

It should be noted that some steps of the methods described above can be independent of the order of execution reported. In addition, some steps can be optional. Furthermore, some steps of the methods can be performed repetitively, or they can be performed in series or in parallel with other steps of the method.

The characteristics and advantages of the invention will become clearer from the detailed description of a preferred embodiment thereof, shown, for illustrative and non-limiting purposes, with reference to the appended drawings, wherein.

Figure 1:
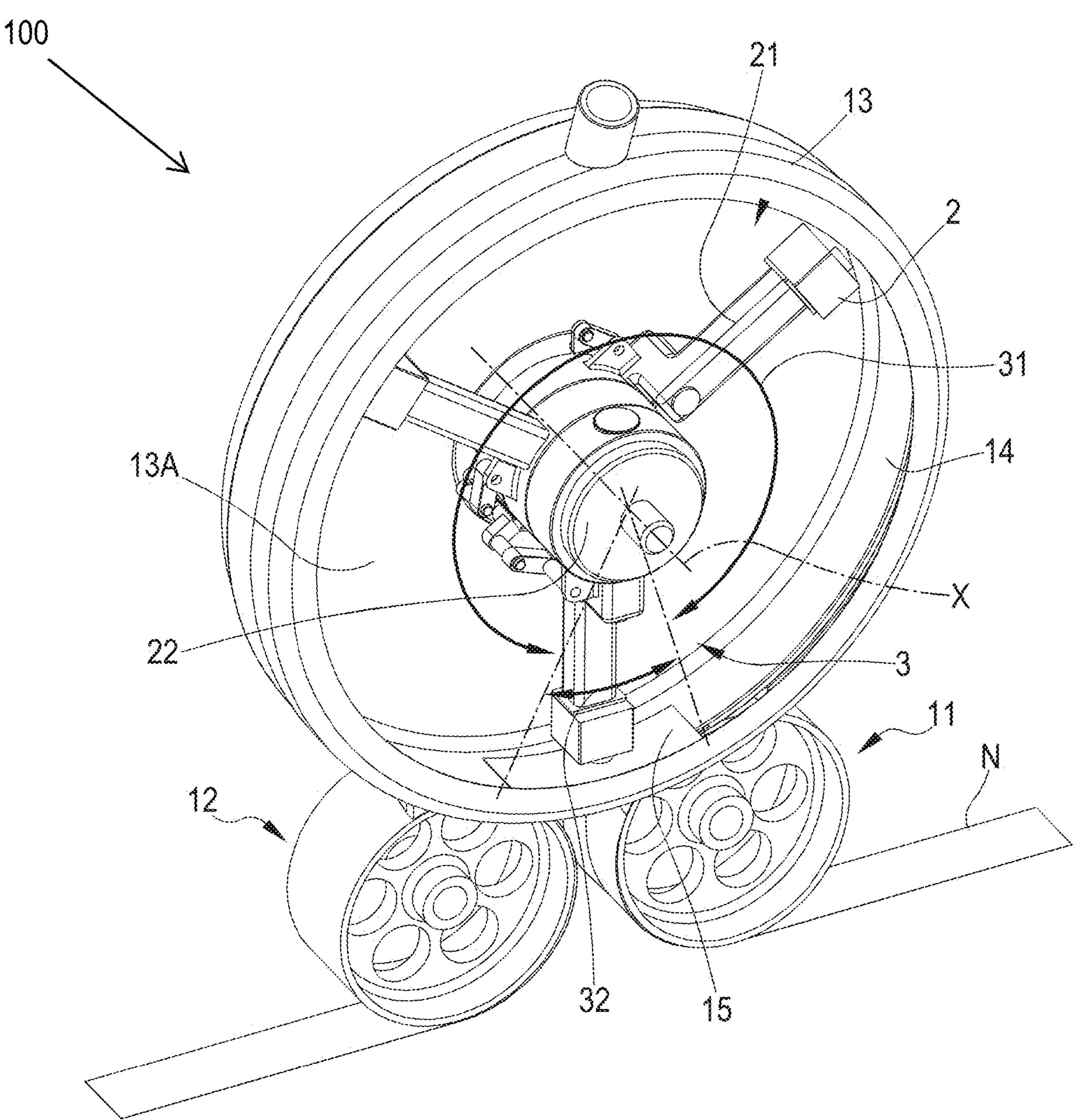
FIG. 1 is a perspective view of an apparatus made according to the present invention.

Referring initially to FIG. 1, an apparatus for non-contact processing a ribbon-like article N made in accordance with the present invention is globally referred to as 100.

In preferred embodiments, the ribbon-like article N on which the apparatus 100 performs non-contact processing is intended for producing electrochemical cells.

For this purpose, the processing can be represented by the creation of a pattern at a longitudinal edge B of the ribbon-like article N. It should be noted that in the context of electrochemical cell production, anode and cathode can be obtained by winding a sheet of suitably processed conductive material. Such processing typically comprises creating a specific pattern on the edge so of the sheet of conductive material. It is advantageous to make the sheet thus processed from a ribbon-like article on which the pattern is cyclically repeated and which is subsequently cut into individual sheets.

It must be understood, however, that this processing represents a possible embodiment and that the apparatus 100 according to the present invention can be intended for other processing, even of a different type, on any ribbon-like article.

As it can be appreciated from FIG. 1, the apparatus comprises a conveying device 1 that allows feeding the ribbon-like article N during its processing. The conveying device 1 can be part of an electrochemical cell production line, or more generally of other finished or semi-finished products. In the figures, only an inlet section 11 and an outlet section 12 of the ribbon-like article N are illustrated, it being understood that upstream and downstream of these sections there can be other components of the production line, the description of which is, however, not crucial for understanding the present invention.

Preferably, feeding the ribbon-like article N is achieved by means of a wheel system and, in preferred embodiments, it is provided that the conveying device 1 comprises a first wheel 11A, at which said inlet section 11 is defined, a second wheel 12A, at which said outlet section 12 is defined, and a main wheel 13A, by means of which the ribbon-like article N is conveyed from the inlet section 11 to the outlet section 12 and at which preferably non-contact processing takes place according to the methods described in greater detail hereinafter. The part comprised between the inlet section 11 and the outlet section 12 will generally be referred to as connecting part 13.

The main wheel 13A is rotatable around an axis of rotation X by feeding the ribbon-like article N at a preferably constant feed rate.

Figure 3:
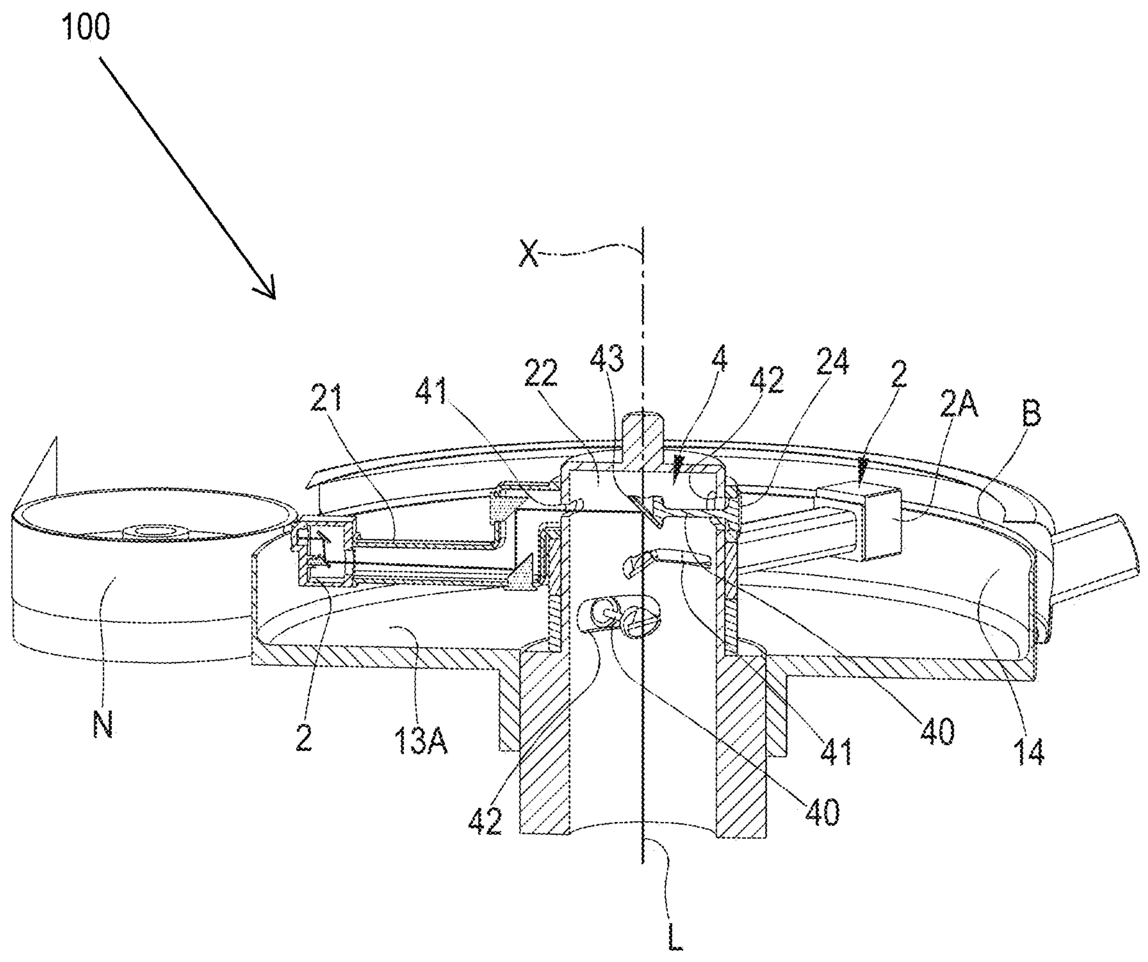
FIG. 3 is a side section view of the apparatus according to the present invention.

As it can be better seen from FIG. 3, the main wheel 13A comprises a perimeter wall 14 on which the ribbon-like article N is externally supported during its movement.

Advantageously, the perimeter wall 14 is configured in such a way that the edge B of the ribbon-like article N protrudes in the axial direction, i.e. along the axis of rotation X, from the perimeter wall 14.

The edge B of the ribbon-like article N can thereby be submitted to non-contact processing by operating units 2 facing the edge B. For example, the operating units 2 can be laser heads that operate, without contact, on the edge B of the ribbon-like article to perform a pattern. For this purpose, in preferred embodiments, the operating units 2 can comprise galvanometers 2A. The use of galvanometers 2A advantageously allows for the presence of movable processing elements 23, preferably comprising mirrors 23A, which can be moved rapidly, e.g. with response so times in the order of milliseconds, by directing a light beam in such a way as to carry out a specific processing on the ribbon-like article N and in particular on the edge B.

In some embodiments, the operating units 2 are supported on respective arms 21 that extend radially from a rotating body 22 which allows them to be moved according to methods that will be described in more detail hereinafter.

As better visible in the embodiment illustrated in FIG. 3, the arms 21 can be supported on respective ring-shaped bodies 24 which extend perimetrically to the rotating body 22 and are rotationally constrained thereto.

Preferably, the rotating body 22 is hollow and is configured in such a way as to allow the passage of a light beam L that can allow to carry out non-contact processing on the ribbon-like article N. In order to allow the transmission of the light beam L up to the operating units 2, a slot 41 made on the rotating body 22 can be provided at each arm 21.

In some embodiments, the rotating body 22 can comprise an additional slot 42, placed in a position radially opposite to the slot 41 and through which a support 40 connected to one of the ring-shaped bodies 24 and supporting a reflecting element 43 protrudes towards the inside of the rotating body 22.

The reflecting element 43 is advantageously placed to intercept the light beam L, preferably at the axis of rotation X, and divert the beam towards a respective arm 21. The reflecting element 43 can further be configured to let a part of the beam L pass to a subsequent reflecting element 43 along the axis X. In this way, a same beam can still be used for all the operating units 2 present in the apparatus 100.

Figure 2:
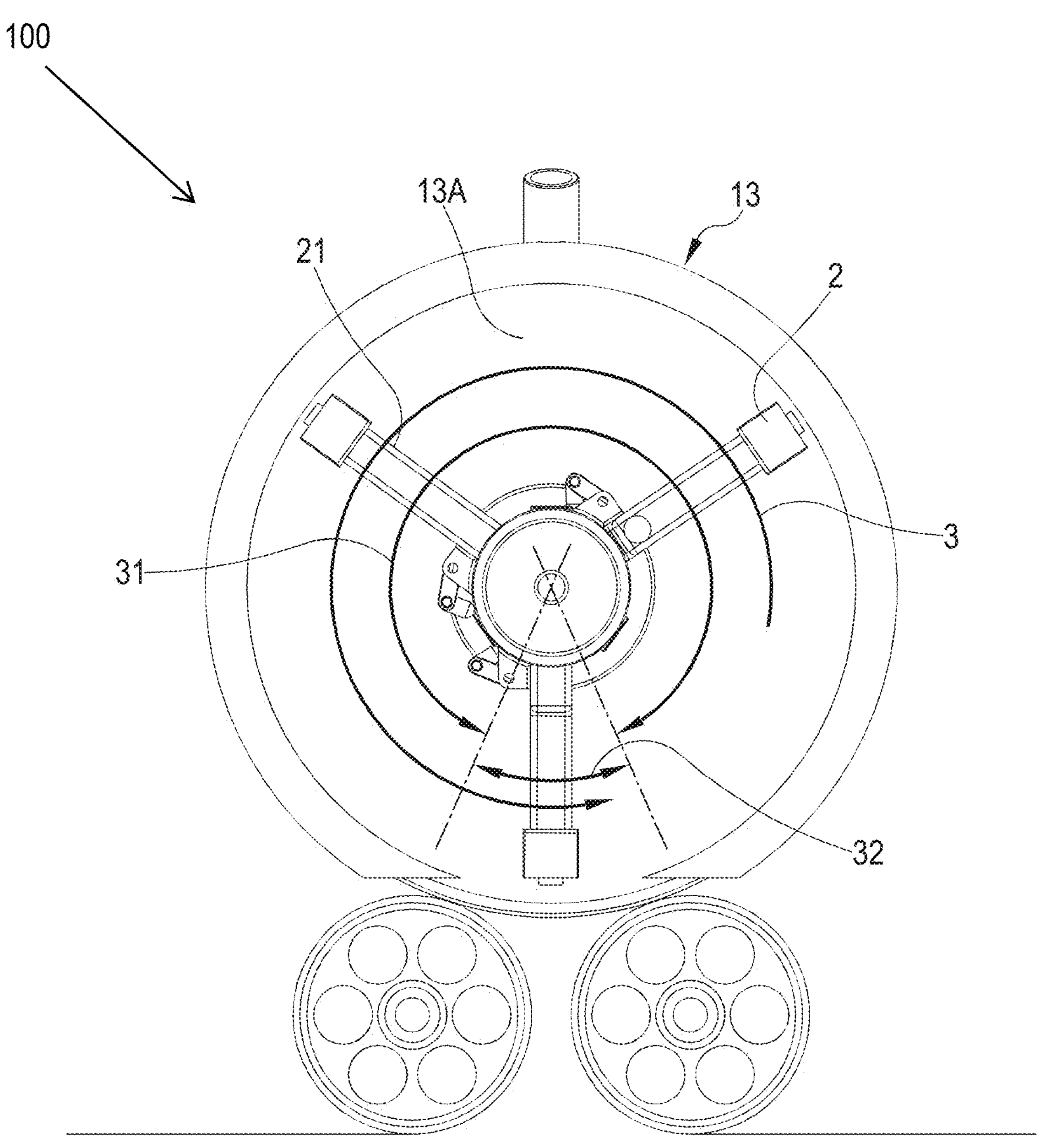
FIG. 2 is a plan view of the apparatus according to the present invention.

Still referring to FIGS. 1 and 2, in preferred embodiments, the operating units 2 move along a loop path 3, in such a way as to follow the ribbon-like article N as it is fed through the main wheel 13A or, more generally, along the connecting part 13. In other words, the operating units 2 can move with a lower speed and concordant in direction to the feed rate va of the ribbon-like article N.

Figure 5:
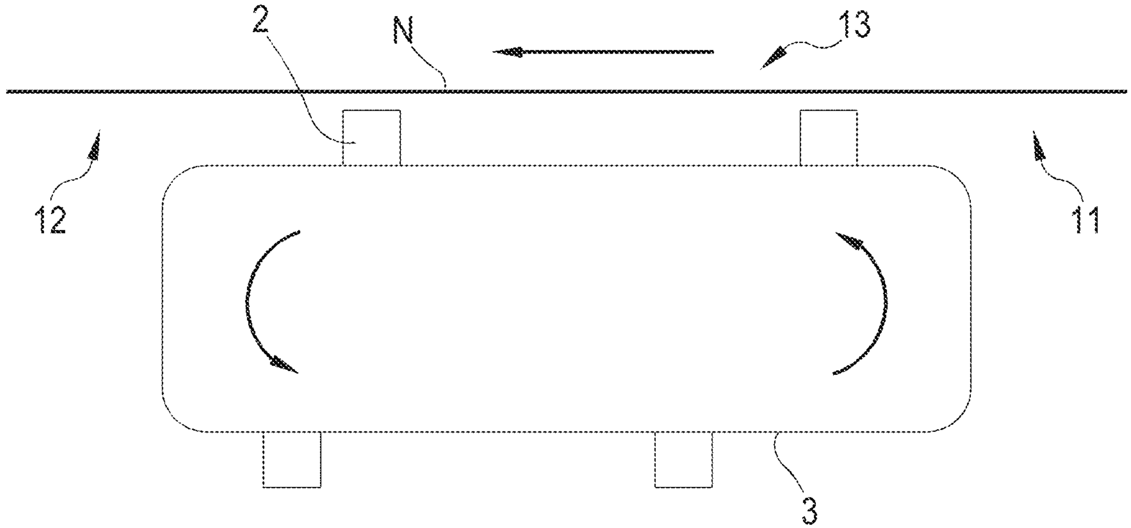
FIG. 5 is a schematic plan view of an alternative embodiment of the apparatus according to the present invention.

In preferred embodiments, the loop path 3 is formed by a circumference, preferably concentric to the arc of a circle that defines the connecting part 13 on the wheel 13A. It will be however appreciated that, more generally, the loop path 3 can be closed, but with a different shape than a circle, such as in the embodiment of FIG. 5.

Still referring to FIG. 2, the loop path 3 can be constructed in such a way that the operating units 2 are arranged internally with respect to the connecting part 13 and preferably internally to said perimeter wall 14 so as to face the ribbon-like article N.

Such an arrangement eases the possibility of placing a suction device outside the main wheel 13A to remove any processing residues, such as those that can be generated in the case of non-contact laser processing.

In some embodiments, not illustrated in the Figure, there can be more than one operating units 2, positioned both internally and externally to the perimeter wall 14 of the wheel 13A.

It is thereby possible to carry out non-contact processing operations, possibly of different types, simultaneously on opposite faces of the ribbon-like article N.

Also in this case, the presence of a suction device &can be provided, possibly positioned further externally to the group of operating units 2 arranged externally to the perimeter wall 14.

As it can be noted from the figures, in preferred embodiments, the apparatus 100 comprises at least three operating units 2 that are placed in different positions along the loop path 3. In further preferred embodiments, the apparatus comprises at least six operating units 2.

It will be appreciated, however, that the present application can also be applied with different numbers of operating units 2, and in particular, the apparatus 100 can comprise two or more operating units 2.

As visible in FIG. 2, the loop path 3 comprises a processing portion 31 and a reset portion 32, into which the path 3 is preferably ideally divided.

In this regard, it will be appreciated that in preferred embodiments, the processing portion 31 and the reset portion 32 form respective angular sectors that, preferably, globally form an angle of 360°.

Thus, in preferred embodiments, the operating units 2, during their motion around the axis X, can be placed alternately in the processing portion 31 and in the reset portion 32.

As mentioned above, and as illustrated in FIG. 3, along the processing portion 31, the operating unit 2 is facing the edge B of the ribbon-like article N and can perform a predetermined non-contact processing operation. Preferably, a protection element 15 can be provided along the reset portion 32, placed so as to face the operating units 2 when they are in the reset portion 32 and interposed between the operating units 2 and the ribbon-like article N. It is thereby possible to prevent the light beam produced by the operating units 2, or other emitted energy source, from reaching the ribbon-like article N in a different position from the processing portion 31.

Preferably, the operating units 2 are configured in such a way that at each instant of operation of the apparatus 100, at least one of the units is placed in the processing portion 31 of the loop path 3 so as to perform the non-contact processing operations on the ribbon-like article N. Referring to further possible examples, in case three units 2 are present, as in the case illustrated in the figure, at least two of them will preferably be placed in the processing portion, and in case where 6 units 2 are present, at least three of them will preferably be placed in the processing portion.

The operation of the apparatus 100 can provide for the units 2 to move differently, in particular at different speeds, in the processing portion 31 and reset portion 32 of the loop path.

Advantageously, the speed of the units 2 along the processing portion 31 can be selected such that the relative movement between the units 2 and ribbon-like article N is suitable for performing the intended processing. It will be therefore possible to provide that the speed difference Av between a first speed v1 of the unit 2, which represents the speed thereof along the processing section 31, and the feed rate va of the ribbon-like article N is lower than a predetermined value.

This value can be determined on the basis of the type of intended processing and on the basis of the technical characteristics of the operating units 2.

Within the reset portion 32, the operating units 2 can have a second speed v2, also different from the first speed v1.

In preferred embodiments, such speed difference allows the operating units to be fed at the first speed v1 lower than the feed rate va of the ribbon-like article N and to make up for such speed difference in the reset portion 32, where the unit 2 is accelerated. In other words, therefore, the second speed v2 is greater than the first speed v1.

The speed variation of the operating units 2 is preferably carried out by means of a device 4 for varying the speed of movement of the operating units 2, configured in such a way as to modify the speed of each of said operating units 2, individually, according to their position along the loop path 3.

Thus, in preferred embodiments, the variation device 4 can be configured in such a way as to vary the speed of the operating unit 2 from the first speed v1 to the second speed v2 when passing from the processing portion 31 to the reset portion 32, and vice versa from the second speed v2 to the first speed v1 when passing from the reset portion 32 to the processing portion 31.

Preferably the variation device 4 can act on each of the arms 21, move each of the arms 21, individually, along the rotating body 22. As it can be seen from FIG. 3, the arm 21 can rotate relative to the body 22 by the rotation of the ring-shaped body 24 around the axis X. The body 24 can in other words slide on the outer peripheral surface of the rotating body 22, consequently moving the arm 21, which it supports.

Figure 4:
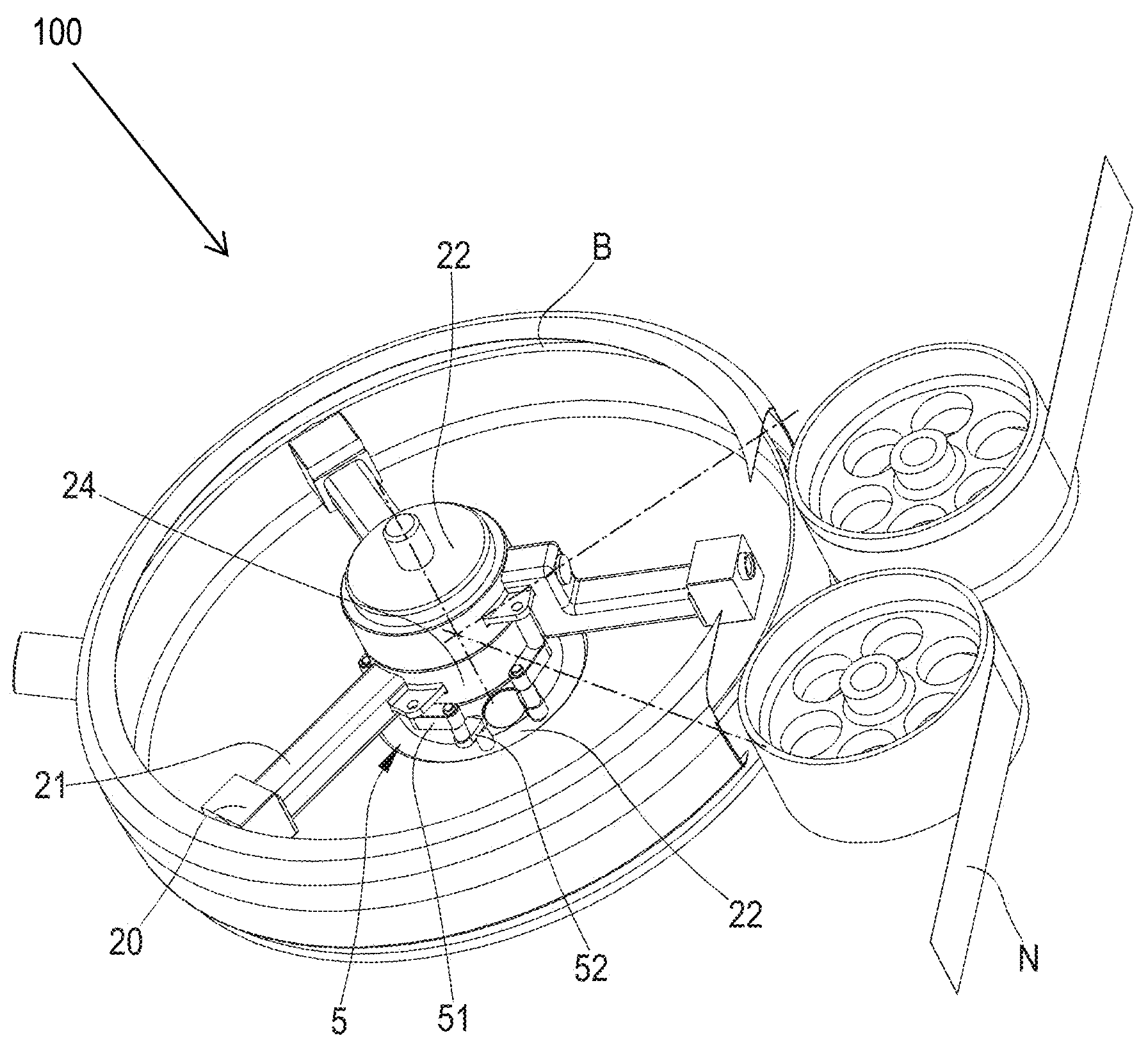
FIG. 4 is a further perspective view of the apparatus according to the present invention, with a protection element removed for illustrative clarity.

As illustrated in the embodiment of FIG. 4, the movement of the body 24, or more generally of the arm 21, can be performed by means of a first rod 51 rotatably connected to the rotating body 22 and a second rod 52 rotatably connected at a first end thereof to the arm 21 and at a second end thereof to the first rod 51 itself.

Thus, when the first rod 51 is rotated, a corresponding movement of the second rod 52 and, consequently, of the relative arm 21 is obtained. This rotation of the rod 51 can then take place at specific positions of units 2 along the loop path 3. The rod 51 of each arm 21 can also be rotated independently of the other rods, thus allowing each arm 21 to be moved independently of the others.

Preferably, the variation device 4 is in fact configured in such a way as to move the arm 21 with respect to said rotating body 22, in a direction concordant with the direction of rotation thereof, when the arm 21 is in the reset portion 32, so as to accelerate it. Advantageously, the arm 21 is moved in the opposite direction when it is in the processing portion 31 so that it is slowed down.

It will thereby be possible to make up for the difference accumulated during the processing on the ribbon-like article N along the processing portion 31 in the subsequent reset portion 32.

It will also be appreciated that the transit of the unit 2 in the reset portion 32 can advantageously be used to provide instructions for performing the specific processing on the ribbon-like article N. In this regard, it should be noted that even in case of a repetitive pattern, the repetition pace of the pattern does not necessarily coincide with the pace of the operating units 2, i.e. with the time required to run along the loop path 3 or the time required for a further operating unit to reach the processing portion 31 again, in case more than two operating units are present. The set of processing instructions initially provided to the operating unit 2 can therefore no longer be correct in the light of this circumstance.

The transit of the operating unit 2 along the reset portion 32 can also be advantageously exploited to modify the processing instructions given to the operating unit to perform a specific processing operation.

In other words, a second set of processing instructions can be provided along the reset portion 2 by which the different pace illustrated above is taken into account, modifying indeed the processing which will be carried out by the operating unit 2 once it has returned to the processing portion 31.

This second set can then take into account the different paces between the ribbon-like article N and the operating units 2, e.g. by resuming pattern processing at the appropriate position.

Obviously, in order to meet specific and contingent application needs, a person skilled in the art will be able to make further modifications and variants to the above-described invention that are nevertheless within the scope of protection as defined by the following claims.

The invention claimed is:

1. An apparatus for non-contact processing a ribbon-shaped article comprising:

a conveying device of the ribbon-shaped article comprising an inlet section, an outlet section and a connecting part extending between said inlet section and said outlet section;

at least two operating units, wherein the at least two operating units are laser heads, configured to perform non-contact processing on the ribbon-shaped article, said operating units being movable along a loop path, said loop path comprising a processing portion facing said connecting part along which said operating units can perform non-contact processing on the ribbon-shaped article; and a device for varying the speed of movement of said operating units, said variation device being configured in such a way as to vary the speed of each of said operating units, individually, according to a position thereof along said loop path.

2. The apparatus according to claim 1, wherein said operating units are configured to move along the processing portion of the loop path at a first speed and to move at a second speed, higher than said first speed, along a reset portion of said loop path.

3. The apparatus according to claim 1, wherein said conveying device is configured in such a way as to feed the ribbon-shaped article at a feed rate along said connecting part and said operating units are configured in such a way as to move at a first speed along said processing portion, wherein the speed difference between said first speed and said feed rate is lower than a predetermined value.

4. The apparatus according to claim 1, wherein the at least two operating units are configured to move along the processing portion of the loop pat at a first speed and the first speed is lower than and synchronised in direction with a linear feed rate of the ribbon-shaped article in said processing portion.

5. The apparatus according to claim 1, wherein said connecting part extends along an arc of a circle and defines a centre of curvature, said operating units being rotatable about an axis of rotation passing through said centre of curvature.

6. The apparatus according to claim 1, wherein said operating units are supported on respective arms radially extending from a rotating body.

7. The apparatus according to claim 6, wherein said arms are supported on respective ring-shaped bodies which extend perimetrically to said rotating body and are rotationally constrained thereto.

8. The apparatus according to claim 5, wherein said operating units are supported on respective arms radially extending from a rotating body, and wherein said rotating body is hollow and is configured in such a way as to let the light beam pass, said light beam being transmitted through respective slots formed in said rotating body to each of said arms.

9. The apparatus according to claim 6, wherein said variation device is configured in such a way as to move each of said arms, individually, along a perimeter direction of said rotating body.

10. The apparatus according to claim 9, wherein said variation device comprises a first rod rotatably connected to said rotating body and a second rod rotatably connected at a first end thereof to said arm and at a second end thereof to said first rod, in such a way that a rotation of said first rod results in the movement of the relative arm.

11. The apparatus according to claim 1, wherein said non-contact processing is carried out by supplying energy to the ribbon-shaped article.

12. The apparatus according to claim 11, wherein said energy is supplied to the ribbon-shaped article by a light beam or by ultrasound.

13. The apparatus according to claim 12, wherein said non-contact processing is non-contact laser processing.

14. The apparatus according to claim 13, wherein said operating units are laser heads.

15. The apparatus according to claim 1, wherein said non-contact processing includes patterning or etching processing.

16. A method for non-contact processing a ribbon-shaped article comprising in the order:

arranging at least two operating units configured to perform non-contact processing on the ribbon-shaped article, said operating units being movable along a loop path comprising a processing portion along which said operating units are facing the ribbon-shaped article;

feeding the ribbon-shaped article at a feed rate on a conveying device;

performing by means of at least one of said operating units a predetermined non-contact processing on the ribbon-shaped article while said ribbon-shaped article moves at said feed rate and said at least one operating unit moves along said processing portion at a first speed; and increasing the speed of said at least one operating unit to a second speed, which is higher than said first speed when it has finished non-contact processing on the ribbon-shaped article, at a reset portion of said loop path.

17. The method according to claim 16, wherein the speed difference between said first speed and said feed rate is lower than a predetermined value, said first speed being lower than and synchronised in direction with a linear feed rate of the ribbon-shaped article.

18. The method according to claim 16, wherein the speed of said operating units is varied, individually, according to a position thereof along said loop path.

19. The method according to claim 18, wherein said operating units are supported on arms constrained to a rotating body, the speed of each of said operating units being varied by moving a respective arm with respect to said rotating body while said rotating body rotates, said arms being movable independently of each other.

20. The method according to claim 19, wherein the speed of each of said operating units is increased by moving the respective arm in a direction with respect to said rotating body and is decreased by moving the respective arm in the opposite direction.

21. The method according to claim 16, wherein performing by at least one of said operating units said predetermined processing comprises supplying energy to the ribbon-shaped article.

22. The method according to claim 21, comprising supplying energy to the ribbon-shaped article by a light beam or by ultrasound.

23. The method according to claim 22, wherein said non-contact processing is carried out by laser.

24. The method according to claim 16, wherein said non-contact processing includes patterning or etching processing.

* * * * *